INVENTOR.
HORST HERBRICH

INVENTOR.
HORST HERBRICH

United States Patent Office 3,521,178
Patented July 21, 1970

3,521,178
CONTINUOUSLY EMITTING SOLID-STATE LASER DEVICE
Horst Herbrich, Augrabenweg 62, Frankfurt am Main-Hochst, Germany
Filed May 12, 1969, Ser. No. 823,550
Claims priority, application Germany, May 10, 1968, 1,764,290
Int. Cl. H01s 3/09
U.S. Cl. 330—4.3                                20 Claims

ABSTRACT OF THE DISCLOSURE

Laser apparatus comprising a solid state laser bar, at least a pair of pumping light sources for exciting the laser bar by light beams therefrom, at least a pair of elliptical mirrors having a pair of focal points, each of the light sources being placed in one of the focal points, the elliptical mirrors being arranged with the other of the focal points coinciding in one point, the laser bar being placed in the said point of coincidence, a spherical mirror placed between each of the elliptical mirrors and the laser bar and having a center of curvature coinciding with the one focal point, the spherical mirrors having aperture means formed therein at a portion thereof lying on a path connecting the focal points, and means associated with the spherical mirrors for conducting away the ballast component of the light beams directly incident on the elliptical mirrors.

---

Figure 1:
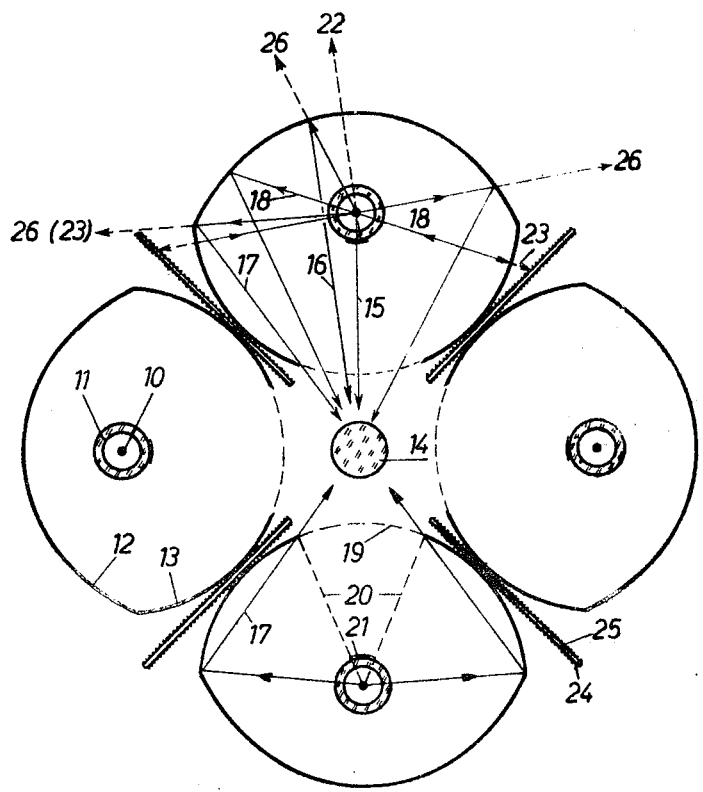

The present invention relates generally to a laser apparatus, and more particularly, it relates to a continuously emitting solid-state laser apparatus having at least a pair of pumping light sources therein each of which is placed at one of the focal points of an eliptic mirror which is made to pass only ballast radiation and in which the laser bar is placed in the other of the focal points of the eliptic mirrors which is common to all of the eliptic mirrors.

The eliptic mirrors of solid-state lasers of the above-mentioned type usually comprise or are made from a hardened glass which passes only ballast radiation so that the light reflected by such mirrors onto the laser bar represents only the pumping frequency band necessary to produce the laser effect. In addition, the laser bar is directly radiated by the pumping light sources which generally are of the gas discharge or halogen quartz lamp types. The direct radiation contains ballast components (heat) which are harmful in their effect on the laser bar and cause a certain heating of the laser bar. The heating of the laser bar leads in turn to an arching of the otherwise parallel end surfaces thereof. If one considers that in order to produce the laser effect, the end surface of the laser bar must show a parallelism within 2°/second, it becomes imperative that the laser bar be protected from strong heating. Furthermore, such heating can lead to cracks and to an untimely destruction of the laser bar. It should also be noted that the efficiency of the laser beam sharply decreases if the bar becomes heated.

In order to avoid the above-described harmful effects on the laser bar heretofore it was a common practice to limit the output of the pumping light sources. This measure, however, disadvantageously effects the energy output of the laser bar which is approximately proportional to the radiation energy falling on the laser bar from the light sources.

Such limitation of the output of the pumping light sources acquires great significance in multi-mirror laser arrangements since the efficiency of such arrangements is relatively low to begin with. Such low efficiency of the multi-mirror laser arrangements is due mainly to the fact that a large portion of the light from the pumping sources does not fall directly onto the associated eliptical mirror but it falls indirectly into the inside of a chamber formed by the mirror where a portion of it, as pointed out above, falls directly on the laser bar while another portion of it at nearly random angles of incidence falls on the other eliptic mirrors. Such radiation becomes then reflected several times in an uncontrolled fashion during which process a certain energy loss occurs through absorption before the remaining portion accidentally could fall on the laser bar.

It is, therefore, an object of the present invention to provide a solid-state laser arrangement of the multi-mirror type in which at equivalent bar lengths a considerably higher output as well as a better efficiency is obtainable than in the known solid-state laser arrangements.

In accordance with the invention a spherical mirror is provided between each of the pumping light sources and the laser bar, such spherical mirrors having an aperture means within the region falling on the line connecting the respective pumping light source and the laser bar and, in which the center of curvature of the spherical mirrors coincide with the position of the pumping light source placed in the focal point of the associated elliptical mirror. The invention also provides that the spherical mirrors or means associated therewith abduct the ballast component of the direct radiation falling on the spherical mirrors from the pumping light sources.

Each spherical mirror according to the invention throws the direct radiation through the associated pumping light source placed in the focal point back on the associated elliptical mirror from which such radiation falls directly on the laser bar through the aperture means provided in the associated spherical mirror. With the arrangement according to the invention a higher energy output of the laser bar along with a more efficient operation of the apparatus is obtainable at the same energy outputs of the pumping light sources as in the known devices. Through the heat conducting effect of the spherical mirrors and/or through the similar effect of associated means a harmful heating of the laser bar is prevented which fact permits a substantial increase of the output of the pumping light sources and, consequently, a higher output of the laser bar.

By employing the measures proposed by the invention an increase of the output of the laser bar is obtainable on one hand through the increase of the efficiency of operation and, at the same time, it becomes possible to use much stronger pumping light sources.

The harmful ballast radiation in one of the preferred embodiments of the invention is abducted by providing a spherical mirror with a layer capable of reflecting the entire radiation while in its aperture region the ballast radiation becomes absorbed or reflected.

The spherical mirror according to the invention catches the harmful ballast radiation which otherwise would cause a heating of the inner space formed by the elliptical mirrors and consequently would result in a heating the laser bar. The spherical mirrors according to the invention throw the radiation of the pumping light sources falling on them back to the elliptical mirrors through the respective focal points, where only the light beam which is desirable for the laser bar becomes reflected and is thrown into the common focal point of all the elliptical mirrors where the laser bar is placed. The beam reflected twice through the spherical and the elliptical mirrors and the beam reflected only once through the elliptical mirrors will reach the same location through the aperture means provided according to the invention. The direct radiation reaches the laser bar also through this aperture means while the harmful ballast radiation becomes absorbed or reflected by the aperture means in one embodiment of the invention.

In order to prevent a multi-type reflection between the spherical and the associated elliptical mirrors, the dimensions of the aperture means are selected in all embodiments such that all the light beams reflected by the elliptical mirrors can in their entirety reach the laser bar through the aperture means.

The spherical mirrors according to the invention are constructed so that they either absorb the ballast radiation or they are able to reflect it, therefore, their glass behind the aperture region is coated with a metal, preferably gold or aluminum. The aperture then becomes a portion of the spherical mirror which remains uncoated in another embodiment of the invention.

In an embodiment of the invention, the spherical mirror with the exception of the aperture is made from a material capable of passing only the ballast radiation, such as glass, and between the spherical mirror and the laser bar a heat filter and/or cooling means is arranged. In such embodiment, the spherical mirror reflects only the light band desirable for the laser bar and thereby effects an increase of the operating efficiency thereof in the above-described manner. The ballast radiation passed by the spherical mirror is then caught by the heat and/or cooling means proposed according to the invention. Such embodiment is especially recommended and its advantage resides in that the ballast radiation is not thrown back into the pumping light source and, thereby it does not cause an undesirable heating of such source.

It is further proposed that on the direct path connecting the pumping light source and laser bar, in the region of the aperture means, a ballast radiation filter be arranged which is capable to pass light and, on both sides of such filter a cooling means having large surfaces and operable preferably with cooling water be arranged.

For the ballast radiation filter a glass tube is especially preferred which surrounds the laser bar and in which cooling water is circulated which water in addition may contain appropriate chemicals (dyes) which add to such cooling water also ballast radiation absorbing properties. The cooling water serves for the abduction of the heat generated through the ballast radiation. The aperture means of the spherical mirror in the last mentioned embodiment comprise preferably a cut out portion and the diameter of the glass tube selected such that it protrudes from the direction of the laser bar into the aperture and, at the same time seals such aperture. Additional protection of the laser bar can be achieved by making such cooling tubes from a glass capable of absorbing ballast radiation.

In accordance with a further embodiment of the invention in which the tubes containing the cooling water can be omitted, it is proposed that the aperture means of the spherical mirrors be made from a material capable of absorbing or reflecting ballast radiation.

Such embodiment offers a certain compromise in the following:

The larger portion of the ballast radiation incident on the spherical mirrors is abducted by the cooling means arranged behind such mirrors while the remaining portion of the ballast radiation falling on the aperture means becomes either reflected by the aperture means (under which condition one has to consider a certain heating of the pumping light sources), or becomes absorbed by it. In the last case one has to consider the possible heating of the spherical mirrors.

The invention will become more readily apparent from the following description of preferred embodiments thereof, shown in the accompanying drawings, in which:

FIGS. 1-4 show each in cross-section an embodiment of the laser apparatus according to the invention using a four mirror pumping system for illustrative purposes.

In the figures, the pumping light sources, which are preferably halogen lamps are identified by the reference numeral 10 and the surrounding glass tubes by 11. Each pumping light source then is arranged in a chamber which is formed by an elliptical mirror 12 and of a spherical mirror 13. Both mirrors are shown in the drawing in cross section and as seen in the figures, the mirrors and the pumping light sources are arranged in a cylindrical form. The pumping light sources 10 are placed in one of the focal points of the elliptical mirrors which point at the same time coincides with the center of curvature of the spherical mirrors as seen in the drawings. All elliptical mirrors are arranged to have their other focal points coincide in a common focal point and, into which point the laser bar 14 is placed. Both focal points represents a line due to the cylindrical construction of the mirrors.

The laser bar 14 is excited in a known manner by the light beams emitted from the pumping light sources and thereby emits a laser beam which leaves the laser bar in a direction perpendicular to the sheet of the drawing. As pointed out above, it is imperative for a good efficiency of the laser bar that most of the pumping frequency coming from the pumping light sources reaches the laser bar. At the same time it is desirable to prevent the incidence of the ballast radiation coming from the pumping light sources onto the laser bar, since such radiation results in a harmful heating of the laser bar.

The solution of the above described oppositely poled problems of increasing the efficiency and of eliminating the incidence of ballast radiation on the laser bar will be explained by tracing the path of certain illustrative light beams within the system. Principally, three radiation light groups are of importance: the first group consists of beams which reach the laser bar on a direct path. A representative beam of this group is identified by the reference numeral 15 in FIG. 1. The second group is represented by such beams which first fall on the elliptical mirrors 12 and from then on become reflected onto laser bar 14. Two such beams of this group are shown in FIG. 1 and are identified by the reference numerals 16 and 17. The third radiation group consists of all the beams which fall on the spherical mirror 13 and from then through the pumping light sources fall on the elliptical mirror 12 and, from there they reach laser bar 14. Such a beam is identified by the reference numeral 18 in FIG. 1.

The spherical mirrors 13 in FIG. 1 are constructed similarly like the elliptical mirrors 12 so that they reflect the pumping frequency and pass the ballast radiation. For the material of such mirrors the Duran-type glass material which possesses the required properties is especially recommended. The spherical mirrors 13 are provided each with an aperture means 19, the dimensions of which are calculated according to the path of the side beams 17. The aperture means 19 in this embodiment represent a cut-out portion in the spherical mirrors 13. The aperture angle is defined by two dash lines 20 in FIG. 1 and, corresponding to such angle a masking 21 is provided on the glass tube 11. The mask 21 is capable of passing the pumping frequencies but it is made to reflect the ballast radiation. In this manner the ballast radiation is prevented to enter aperture means 19. The ballast radiation reflected by mask 21 is identified by a dashed arrow 22 as passing through the elliptical mirrors.

The ballast component of the beams 18 which fall on the spherical mirror 13, such ballast component being identified by the dashed arrow 23, will be caught by a cooling means 24, 25. The cooling means 24, 25 comprises a bronze sheet 24 having a thickness of about .1 mm. and which is corrugated in order to present a larger surface and, at the same time, being colored black, is formed to surround a void space 25 through which a fluid or air is circulated. The ballast component of the beam incident on the elliptical mirror 12 reaches the free space through mirror 12 and is identified by dashed arrow 26.

In the event that the chambers formed by mirrors 12 and 13 are surrounded by an outer cover, it is then advantageous to circulate a cooling air stream through the space formed by the chambers or mirrors and the outer cover. The inner chamber of the mirrors can also be cooled by being circulated through with air. It is also possible and recommendable that the laser bar 14 itself have a central bore for the circulation of a cooling medium therethrough.

Figure 2:
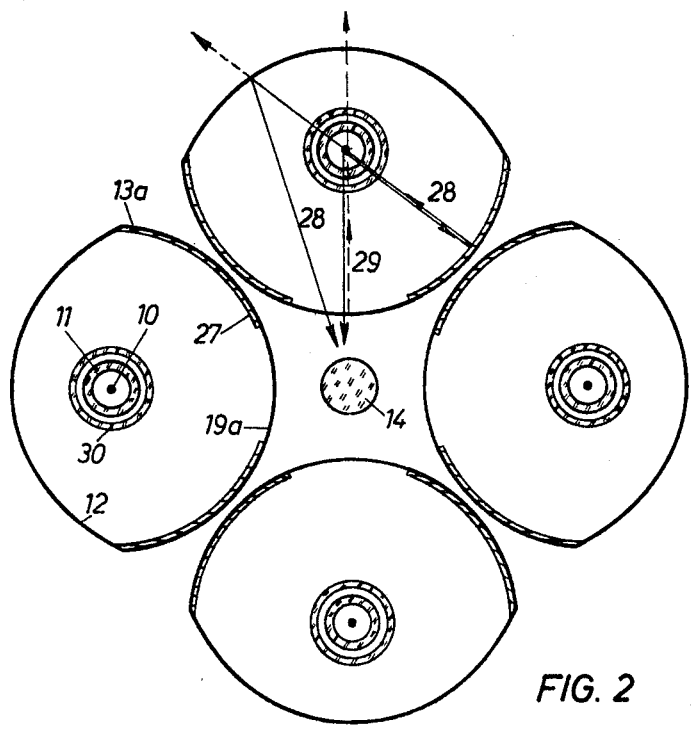

In the embodiment according to FIG. 2, the spherical mirrors identified by the reference numeral 13a, are made of the transmitting type. The spherical mirror is coated by a reflecting layer 27, such as gold or aluminum, which is capable of reflecting the entire beam falling on it from the pumping light sources. The aperture means in this embodiment comprises a region 19a of the mirror which has been left free from the coating. The spherical mirror 13a comprises a material capable of reflecting the ballast radiation or absorbing it, so that the aperture region passes only the pumping frequency. The remaining masked or layer coated portion of the mirror reflects the entire radiation and throws it on the elliptical mirror from which the ballast radiation enters the free space while the pumping frequency component is reflected on the laser bar 14. The radiation path in this embodiment is represented by two characteristics beam paths 28 and 29. The dashed arrows represent the ballast radiation. In this embodiment the cooling means are not essential like they where in the embodiment of FIG. 1, since the entire ballast radiation is abducted into the free space through the elliptical mirror. Inasmuch as the pummping light source, in order to prevent an unnecessary heating of such source 10, it becomes advantageous to provide the pumping light sources 10 with a glass tube 30 surrounding it and in which a cooling medium is circulated as seen in FIG. 2.

Figure 3:
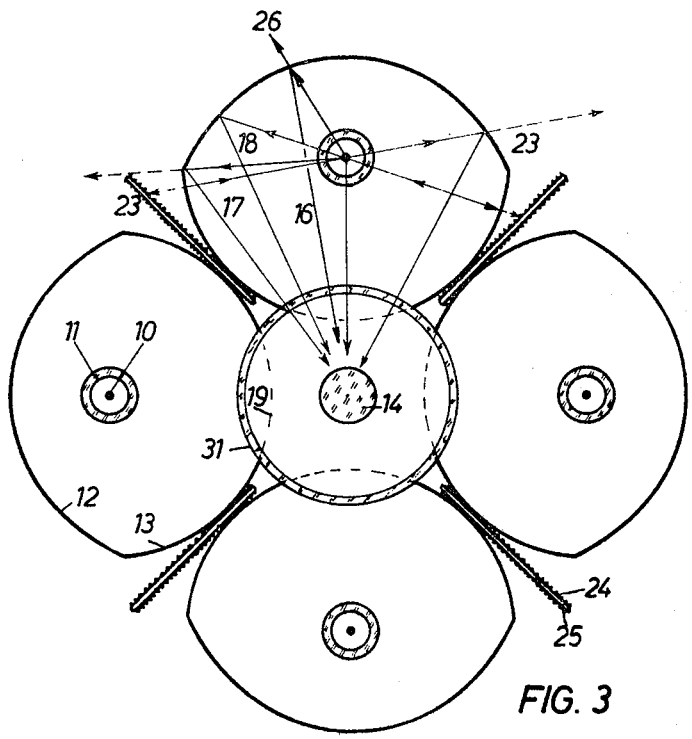

The embodiment according to FIG. 3 substantially corresponds to the embodiment according to FIG. 1. The difference resides in that the glass tube 11 is not masked as it is in FIG. 1 (see 21). Instead, the laser bar 14 is surrounded by a glass tube 31 through which cooling water circulates and which is capable of absorbing the ballast radiation reaching it through the aperture 19 and, at the same time being capable of abducting the resulting heat.

Figure 4:
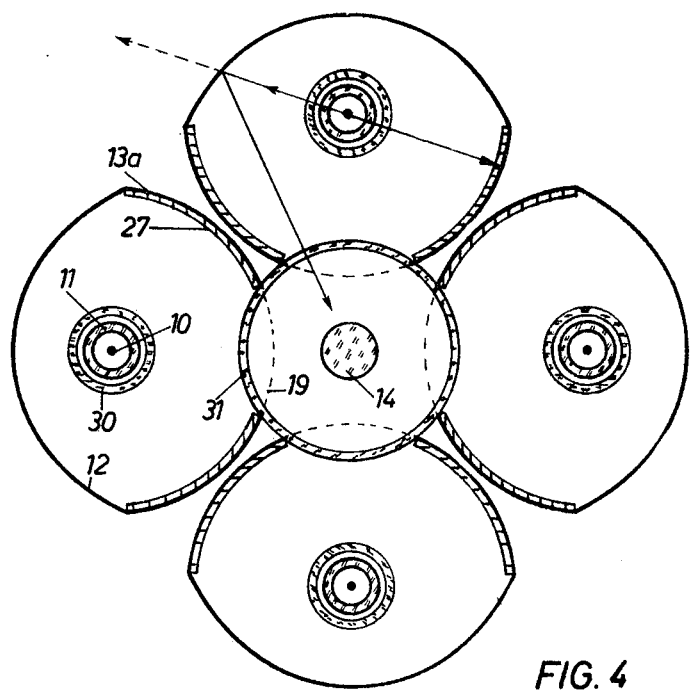

The embodiment according to FIG. 4 is a combination of the embodiment of FIGS. 2 and 3. The spherical mirrors 13a, the surface of which according to FIG. 2 is masked, has an aperture formed therein, which according to FIG. 3 is sealed by a tube 31 surrounding the laser bar 14 and in which cooling water circulates. In order to take care of the ballast radiation reflected by the spherical mirror 13a, the pumping light source 10 also in this embodiment according to FIG. 2 is surrounded by a glass tube 30 through which cooling water circulates.

In the above several possibilities have been described according to the invention to meet the problem of preventing the ballast radiation to reach the laser bar and, satisfactory solutions have been offered in this respect. As a result of the invention, now it becomes possible to raise the output of the pumping light sources and thereby to obtain a substantial increase in the output of the laser device. The advantage of using the spherical mirror according to the invention becomes apparent when the efficiency of the laser operating under the inventive arrangement is compared with that of a known laser arrangement.

In a known laser device having a four source pumping system and, accordingly four elliptical mirrors, but without the presence of spherical mirrors, only about 250° of the light coming from the pumping light sources is caught by the elliptical mirrors and reflected onto the laser bar. On a direct path lights reach the laser bar under an angle of about 15°. Therefore, altogether only about 230°, that is about only 64% of the entire pumping light source frequency reaches the laser bar in the shortest possible way out of the entire radiation scope of 360°. The remaining 36% of the radiation reaches the elliptical mirrors of the other pumping light sources in an uncontrolled manner. These stray beams become reflected within the elliptical mirrors, that is, in the chamber formed by the elliptical mirrors, several times back and forth and a large portion of them becomes obviously lost through absorption.

By employing the measures proposed by the present invention, that is, by using the spherical mirrors arranged across each of the elliptical mirrors, it becomes possible to bring about 330° (315° by the mirrors and 15° directly) of the entire pumping frequency onto the laser bar in a controlled fashion and on the shortest path. This represents about 92% of the entire pumping frequency emitted by the light sources. The unused stray component amounts now only to 8%, compared to the 36% in the known laser systems.

From the above it will be apparent that this invention provides a novel laser device which fulfills all of the objects for the invention. While the invention has been shown and described with reference to preferred embodiments thereof, of course it will be obvious to those skilled in the art that the invention will have variations other than that shown. Thus it will be apparent that the invention is not to be considered as limited by the drawing and description but only as to its spirit and scope as it is set forth in the appended claims.

I claim:

1. Laser apparatus comprising a solid state laser bar, at least a pair of pumping light sources for exciting said laser bar means by light beams therefrom, at least a pair of elliptical mirrors having a pair of focal lines, each of said light sources being placed in one of said focal points, said elliptical mirrors being arranged with the other of said focal points coinciding in one point, said laser bar being placed in said point of coincidence, a spherical mirror placed between each of said elliptical mirrors and said laser bar means and having a center of curvature coinciding with said one focal point, said spherical mirrors having means establishing at least one aperture formed therein at a portion thereof lying on a path connecting said focal points, and means associated with said spherical mirrors for conducting away the ballast component of said light beams directly incident on said elliptical mirrors.

2. Laser apparatus as claimed in claim 1, wherein said aperture means of each of said spherical mirrors is of a size adapted to pass all light beams reflected by the associated elliptical mirror.

3. Laser apparatus as claimed in claim 1, wherein said elliptical mirrors are of a material capable of passing only ballast radiation.

4. Laser apparatus as claimed in claim 1, wherein said aperture means is a cut-out portion.

5. Laser apparatus as claimed in claim 1, wherein a light transmitting cover surrounds each of said light pumping sources, a masking means placed on said cover means on a portion thereof facing said aperture means, said masking means being made from a material capable of reflecting or absorbing ballast radiation from the associated light source, said aperture means having a predetermined angle of opening with respect to the associated light source, said masking means blocking said ballast radiation by spanning said cover means on an angle corresponding to said angle of opening.

6. Laser apparatus as claimed in claim 4, wherein said spherical mirrors are made from a material capable of passing only ballast radiation.

7. Laser apparatus as claimed in claim 6, wherein said material is glass having a coating thereon.

8. Laser apparatus as claimed in claim 1, wherein said associated means comprise a heat filter.

9. Laser apparatus as claimed in claim 1, wherein said associated means comprise a cooling arrangement.

10. Laser apparatus as claimed in claim 1, wherein a reflecting layer is coated onto said spherical mirrors for reflecting all the light falling thereon, said aperture means comprises a portion of said mirror free from said coating.

11. Laser apparatus as claimed in claim 10, wherein said coating is gold or aluminum, said spherical mirrors are made from a glass capable of reflecting ballast radiation.

12. Laser apparatus as claimed in claim 10, wherein said aperture means comprises a material capable of reflecting radiation.

13. Laser apparatus as claimed in claim 10, wherein said aperture means comprises a material capable of absorbing ballast radiation.

14. Laser apparatus as claimed in claim 1, wherein a cooling arrangement is placed around said light sources.

15. Laser apparatus as claimed in claim 9, wherein said cooling arrangement has a large surface and comprises passage means therein for circulating a cooling medium therethrough.

16. Laser apparatus as claimed in claim 15, wherein said cooling arrangement is placed between adjacent spherical mirrors leaving open their apertures only.

17. Laser apparatus as claimed in claim 4, wherein a double walled glass tube is placed to surround said laser bar for circulating ballast radiation absorbing cooling medium therethrough.

18. Laser apparatus as claimed in claim 17, wherein said glass tube seals said aperture means and the glass material thereof is of a ballast radiation absorbing material.

19. Laser apparatus as claimed in claim 4, wherein said laser bar seals said aperture means.

20. Laser apparatus as claimed in claim 1, wherein said laser bar has a central bore passing therethrough for conveying cooling medium through said laser bar means.

FOREIGN PATENTS 966,455   8/1964   Great Britain.

RICHARD A. FARLEY, Primary Examiner

R. E. BERGER, Assistant Examiner

U.S. Cl. X.R.

331—94.5